United States Patent
Waitt et al.

(10) Patent No.: US 9,635,806 B2
(45) Date of Patent: May 2, 2017

(54) MOWER BLADE SPEED CONTROL SYSTEM

(71) Applicant: Deere & Company, Moline, IL (US)

(72) Inventors: Taylor A. Waitt, Benson, NC (US);
Mark D. Evans, Morrisville, NC (US);
David V. Rotole, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/824,704

(22) Filed: Aug. 12, 2015

(65) Prior Publication Data
US 2017/0042084 A1    Feb. 16, 2017

(51) Int. Cl.
| A01D 34/64 | (2006.01) |
| A01D 34/00 | (2006.01) |
| A01D 69/03 | (2006.01) |
| A01D 101/00 | (2006.01) |

(52) U.S. Cl.
CPC ........... *A01D 34/006* (2013.01); *A01D 69/03* (2013.01); *A01D 2101/00* (2013.01)

(58) Field of Classification Search
CPC ...... A01D 37/78; A01D 34/00; A01D 34/006; A01D 69/025; A01D 2101/00; A01D 69/03; B60K 31/00; B60K 6/20; B60K 6/442; B60K 6/46; B60W 20/20; B60W 20/40; B60W 10/30; F16H 61/46; F16H 61/47; F16H 59/40; F16H 59/44; F16H 59/46; F16H 61/431; F16H 61/462
USPC .......... 56/10.2 R, 10.2 A–10.2 E, 10.5, 10.8, 56/11.1, 11.3, 11.7, 11.8; 477/38, 37, 42; 701/50, 93; 475/72, 76, 77, 79, 81, 83; 60/422, 433, 487
See application file for complete search history.

(56) References Cited

U.S. PATENT DOCUMENTS

| | | | |
|---|---|---|---|
| 6,109,009 A | 8/2000 | Benson | |
| 6,655,233 B2 * | 12/2003 | Evans | ..................... F16H 61/46 477/38 |
| 6,675,577 B2 | 1/2004 | Evans | |
| 6,892,517 B2 | 5/2005 | Adams et al. | |
| 7,275,355 B2 | 10/2007 | Adams et al. | |
| 7,310,943 B2 * | 12/2007 | Burgart | ................. F16H 61/431 60/328 |
| 7,370,458 B2 | 5/2008 | Matsuda et al. | |
| 7,554,213 B2 | 6/2009 | Kawakami et al. | |
| 7,669,580 B2 | 3/2010 | Silbernagel et al. | |
| 8,849,490 B2 | 9/2014 | Wyatt et al. | |
| 8,863,485 B2 * | 10/2014 | Pitcel | ................... A01D 69/025 56/10.2 R |

(Continued)

OTHER PUBLICATIONS

British Search Report in foreign counterpart application dated Jan. 19, 2017 (4 pages).

*Primary Examiner* — Robert Pezzuto

(57) ABSTRACT

A mower blade speed control system with an electronic control unit providing engine speed commands to an internal combustion engine having a maximum power speed and a reduced economy speed, and a continuously variable transmission with variable displacement providing rotational power from the engine to a plurality of mower blades. The electronic control unit monitors engine load and automatically adjusts engine speed and the displacement of the continuously variable transmission in response to engine load to achieve a constant rotational speed of a plurality of mower blades at different engine speeds.

13 Claims, 4 Drawing Sheets

(56) References Cited

U.S. PATENT DOCUMENTS

| | | |
|---|---|---|
| 8,880,300 B2 | 11/2014 | Gamble et al. |
| 9,002,585 B2 | 4/2015 | Porter et al. |
| 2004/0163373 A1 | 8/2004 | Adams et al. |
| 2013/0047565 A1 | 2/2013 | Shida et al. |
| 2013/0268170 A1 | 10/2013 | Nishi et al. |
| 2014/0059990 A1 | 3/2014 | Fujiwara et al. |
| 2014/0144116 A1 | 5/2014 | Kraus |
| 2014/0283492 A1 | 9/2014 | Bricko et al. |
| 2015/0210263 A1 | 7/2015 | Anderson et al. |

* cited by examiner

MOWER BLADE SPEED CONTROL SYSTEM

FIELD OF THE INVENTION

This invention relates generally to mowing machines for grass, hay or other vegetation, and specifically to a mower blade speed control system.

BACKGROUND OF THE INVENTION

Internal combustion engines for mowing machines for grass, hay or other vegetation may produce maximum power at maximum engine speed. Additionally, optimal mower blade speed may be required for mowers to maintain high cut quality. For example, optimal rotary blade speed, measured as blade tip speed, is typically between about 12,000 and 19,000 feet per minute, and may be required to maintain high cut quality by lifting grass, make multiple passes over each blade of grass, and disperse the clippings in an even and aesthetically pleasing manner. Similarly, optimal reel mower blade speed for grass may be between about 1800 rpm and about 2300 rpm depending on the number of blades and desired clip rate.

Mowing machines may have a direct relationship between engine speed and mower blade speed. The engine may drive the mower blades through mechanical linkages such as belts and pulleys, drive shafts, gear boxes or fixed displacement hydraulic circuits so that optimal mower blade speed is achieved at maximum engine speed. For these reasons, operators tend to run mowing machines at maximum engine speed at all times to maintain mower blade speed. This may result in high fuel consumption, noise, vibration and machine wear and tear.

A mower blade speed control system is needed that provides optimal mower blade speed while reducing fuel consumption, noise, vibration and machine wear and tear. A mower blade speed control system is needed that can reduce engine speed while maintaining a constant, preset mower blade speed.

SUMMARY OF THE INVENTION

A mower blade speed control system having an internal combustion engine driving a plurality of mower blades with a hydrostatic mow transmission, driving a plurality of traction drive wheels with a hydrostatic traction drive transmission and pedals, and having a mode selection switch. An electronic control unit monitors load of the engine. A mode selection switch is connected to the electronic control unit and has a plurality of engine modes, including a maximum power mode, a maximum economy mode, and an automatically adjusting economy mode. In the automatically adjusting economy mode, the electronic control unit commands the internal combustion engine to run at an economy speed lower than the maximum power speed, increases or decreases the engine speed based on the load of the engine, maps the displacement of the mow transmission to achieve an optimal mower blade speed, and maps traction pump displacement to the pedal position and commanded engine speed.

BRIEF DESCRIPTION OF THE DRAWINGS

FIG. 2 includes FIGS. 2A and 2B as described and shown.

DESCRIPTION OF THE PREFERRED EMBODIMENT

Figure 1:
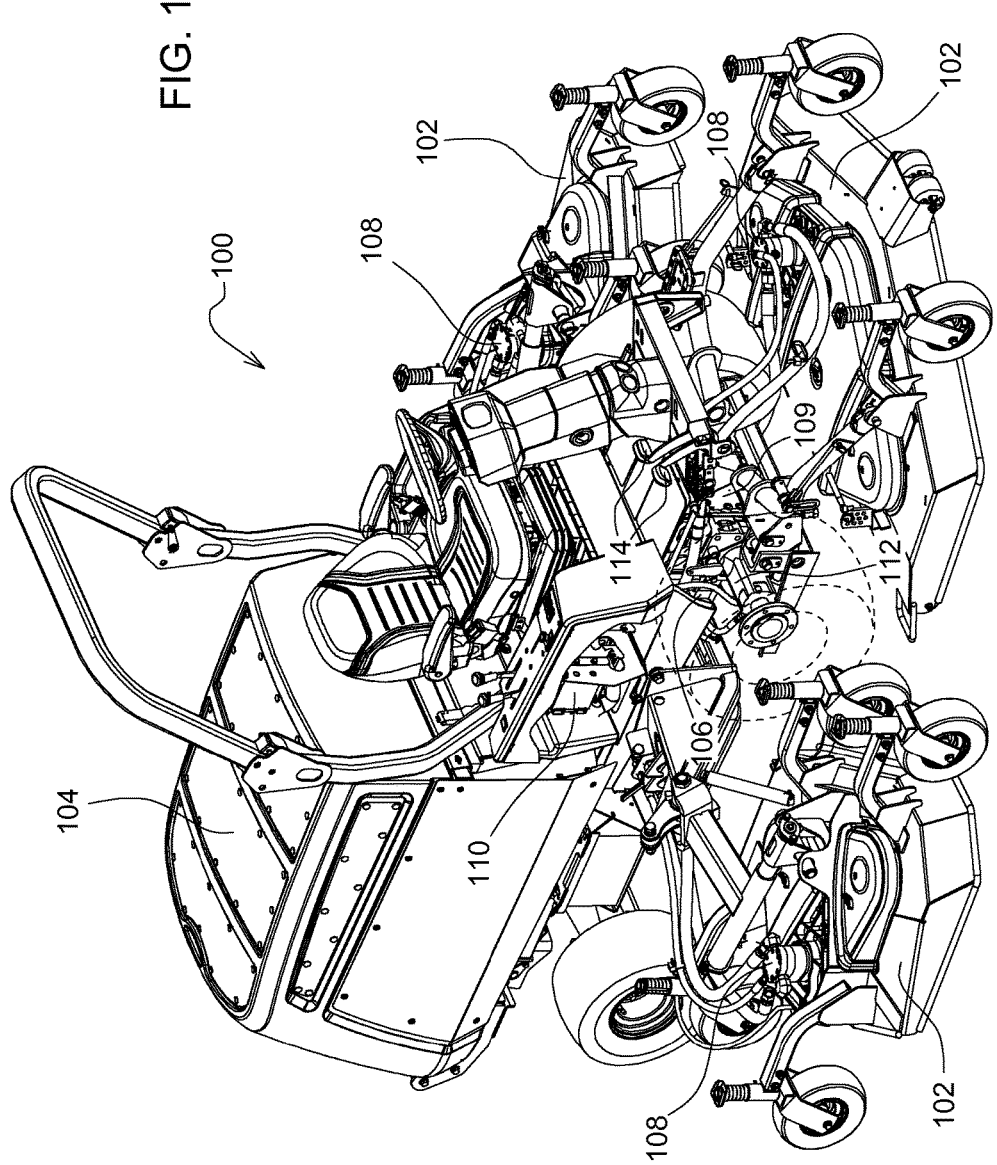
FIG. 1 is a perspective view of a mowing machine with a mower blade speed control system according to one embodiment of the invention.

As shown in FIG. 1, the mower blade speed control system may be on a grass mowing machine such as wide area mower 100 having one or more mower decks 102, each mower deck having one or more rotary cutting blades. The mower blade speed control system also may be provided on other grass mowing machines having rotary cutting blades such as front mount mowers, commercial mowers, zero turn mowers and riding lawn equipment. Alternatively, the mower blade speed control system may be on grass mowing machines having one or more reel mowing units such as a fairway mower or greens mower. The mower blade speed control system also may be provided on agricultural mowing machines that mow hay or other vegetation, such as windrowers.

In one embodiment, the mower blade speed control system may be on a mowing machine having an internal combustion engine located in housing 104. The engine may have a power curve that increases with engine speed (RPM) up to an engine rated speed, or maximum power speed. For example, the maximum power speed may be preset at 2600 RPM. The engine may be sized so that when the traction drive is not moving the mowing machine and/or the mower blades are not subject to a load from the grass, hay or other vegetation, the percentage of available power used to rotate the mower blades may be low enough so the engine has power in reserve. For example, the engine may be sized so that about half, or nearly half, of maximum engine power may be in reserve at the lowest engine speed, such as 2000 RPM, at which an optimal rotary blade tip speed between about 12,000 and 19,000 feet per minute, or an optimal reel blade speed between about 1800 and 2300 rpm, may be achieved without any other loads. In the mower blade speed control system, this low engine speed may be preset and referred to as the economy engine speed. At the economy engine speed, and between the economy engine speed and the maximum power engine speed, the mower blade speed control system may control the mower blade speed at a constant, preset speed while reducing fuel consumption, noise, vibration and machine wear and tear.

In one embodiment, the mower blade speed control system may have a continuously variable transmission providing rotational power from the engine to the mower blades on one or more cutting units. For example, the continuously variable transmission may be a hydrostatic transmission with a variable displacement hydraulic mow pump 106 connected by hydraulic hoses to several fixed displacement hydraulic mow motors 108. The internal combustion engine may drive the mow pump. Each mow motor may rotate a mower blade, or may drive two or more mower blades through a belt and pulley arrangement.

In one embodiment, the mower blade speed control system may have a continuously variable transmission providing rotational power from the engine to one or more traction drive wheels. For example, the continuously variable transmission may be a hydrostatic transmission with a variable displacement hydraulic traction drive pump 109 and one or more fixed displacement hydraulic traction drive motors 112. The internal combustion engine may drive the traction drive pump. Each traction drive motor may be mounted to the frame or axle and may drive one or more wheels. The continuously variable transmission may be connected to one or a pair of operator actuated foot pedals 114 which an operator may depress to enable the traction drive, which may vary between 0 and 100%.

Figure 2A:
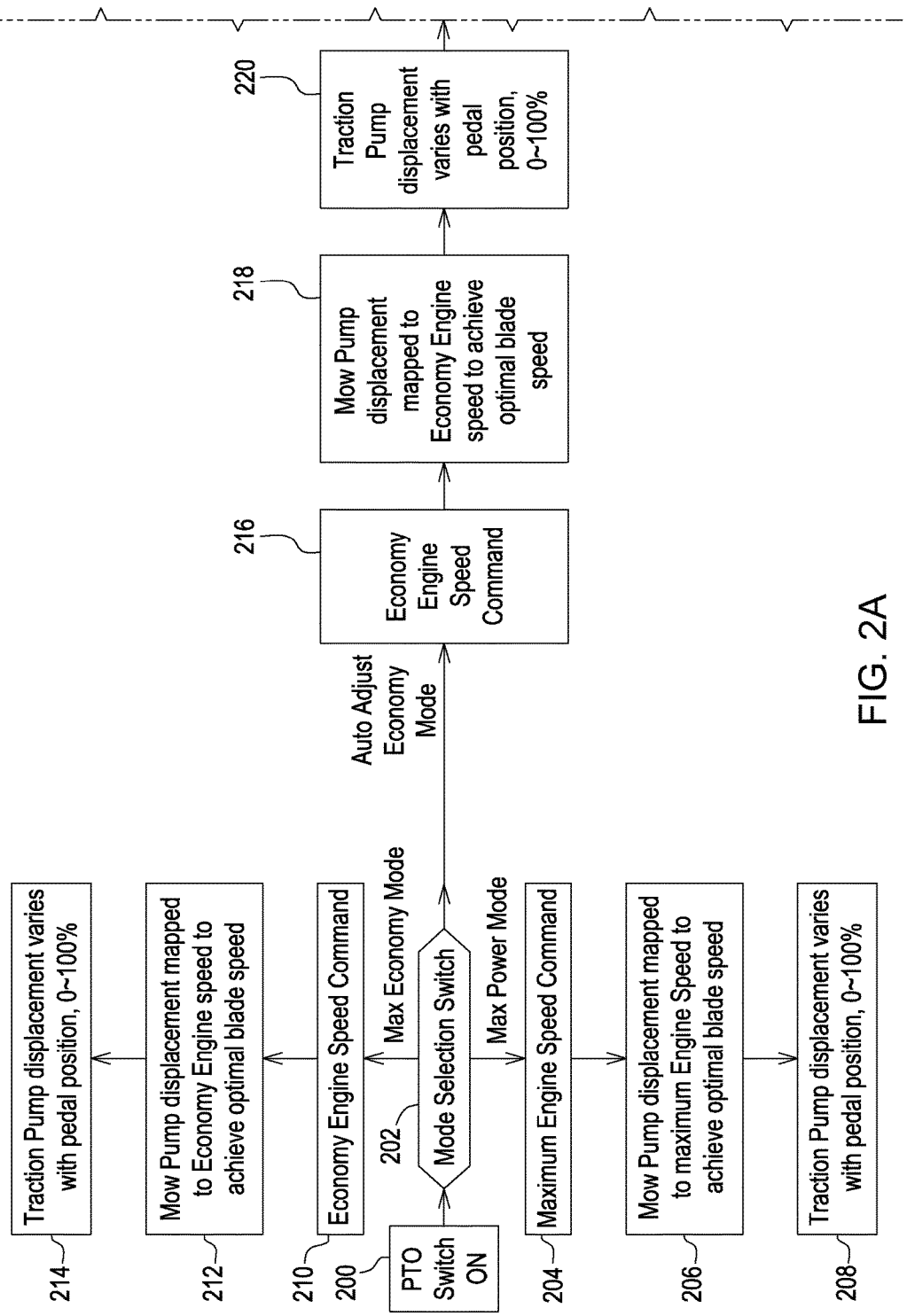
FIG. 2A is the left side of a block diagram of a mower blade speed control system according to one embodiment of the invention.
Figure 2B:
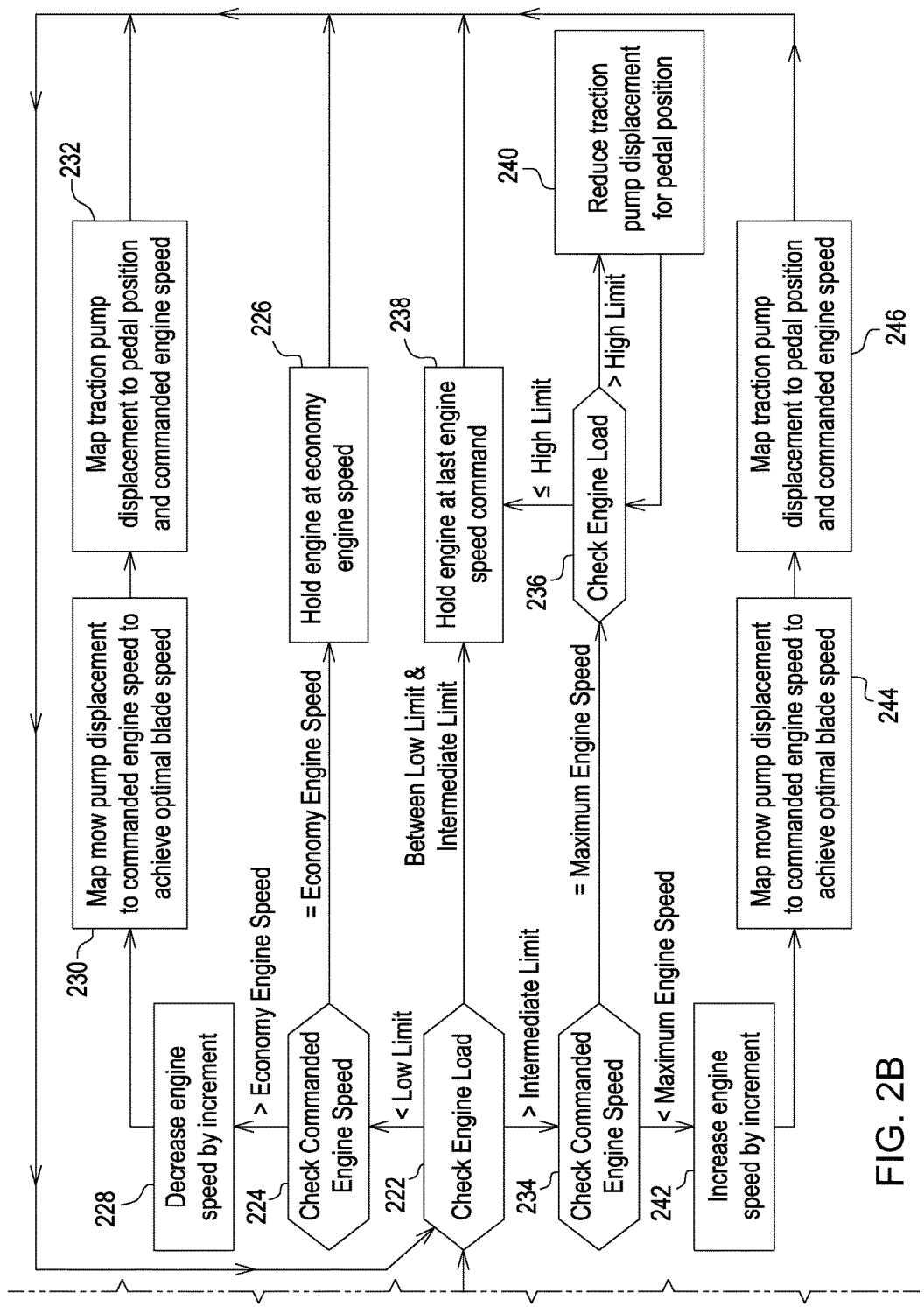
FIG. 2B is the right side of a block diagram of a mower blade speed control system according to one embodiment of the invention.

In one embodiment, the mower blade speed control system may include electronic control unit 110 that uses a control algorithm such as FIG. 2. The electronic control unit may be signal connected to the internal combustion engine. The electronic control unit may use the control algorithm to provide engine speed commands to the engine. For example, the electronic control unit may command engine speed by adjusting the amount of fuel delivered and the ignition timing. The electronic control unit also may receive feedback from the engine indicating actual engine speed. For example, the feedback may be a Hall effect sensor located in close proximity to a rotating part of the engine, such as rotating teeth or targets on the engine flywheel. The electronic control unit also may receive feedback from the engine indicating engine load, which may be defined as power demanded divided by power available at actual engine speed. For example, the engine control unit may determine engine load by monitoring signals from fuel sensors, and comparing actual fuel injector pulse timing to the maximum fuel injector pulse rate.

In one embodiment, the mower blade speed control system may include an electronic control unit signal connected to the mow pump and traction drive pump. The electronic control unit may use the control algorithm to provide displacement commands to the mow pump and traction drive pump, and may receive feedback from the mow pump and traction drive pump indicating the actual displacement of each. For example, the electronic control unit may command the angular position of each pump's swashplate by providing electrical signals to energize a solenoid on one side of a servo piston. The servo piston may cause the swashplate to rotate out of the neutral position to a range of positions between neutral and maximum displacement. The swashplate position may determine how much fluid the mow pump displaces and determines the speed of the motors. The electronic control unit also may be in signal communication to provide feedback regarding the displacement of each pump. For example, the electronic control unit may be connected to angular position sensors for the swashplates on the mow pump and traction drive pump.

In one embodiment, the electronic control unit also may be signal connected to a mower blade speed sensor and a ground speed sensor. For example, the electronic control unit may be in signal communication with Hall effect sensors located in close proximity to one or more mower blade spindles and traction drive wheels.

In one embodiment, the mower blade speed control system may include a control algorithm such as FIG. 2. The control algorithm may include a PTO switch in block 200 that an operator may actuate to engage the mowing system, and a mode selection switch in block 202 that an operator may use to select one of a plurality of mowing modes. For example, the mode selection switch may include a maximum power mode, a maximum economy mode, and an automatically adjusting economy mode that automatically adjusts engine speed for engine load conditions, while maintaining a constant, preset mower blade speed.

In one embodiment, if the operator uses the mode selection switch in block 202 to select the maximum power mode, the electronic control unit may command the engine to run at a preset maximum engine speed such as 2600 RPM in block 204. In block 206, the electronic control unit may command the mow pump displacement based on the commanded engine speed to achieve a constant, preset mower blade speed. For example, the mow pump displacement may be mapped to the preset maximum engine speed of 2600 RPM, to achieve a preset, optimal rotary blade tip speed of 13,000 feet per second, or a reel mower blade speed of 2000 rpm. In block 208, the electronic control unit may command the traction pump displacement based on the traction pedal position of between 0 and 100%.

In one embodiment, if the operator uses the mode selection switch in block 202 to select the maximum economy mode, the electronic control unit may command the engine to run at a preset economy engine speed such as 2000 RPM in block 210. In block 212, the electronic control unit may command the mow pump displacement based on the commanded engine speed, to achieve a constant, preset mower blade speed. For example, the mow pump displacement may be mapped to the preset economy engine speed of 2000 RPM, to achieve the preset rotary blade tip speed of 13,000 feet per second, or the preset reel mower blade speed of 2000 rpm. In the maximum economy mode, the mow pump displacement may approach the maximum displacement. In block 214, the electronic control unit may command the traction pump displacement based on the traction pedal position of between 0 and 100%. For each pedal position, the traction pump displacement may be set higher in the maximum economy mode to achieve the same ground speed as the maximum power mode.

In one embodiment, if the operator uses the mode selection switch in block 202 to select the automatically adjusting economy mode, the electronic control unit may command the engine to run at the preset economy engine speed such as 2000 RPM in block 216, and may automatically increase or decrease the engine speed depending on engine load as described below. In block 218, the electronic control unit may command the mow pump displacement based on the commanded engine speed, to achieve the same constant, preset mower blade speed. For example, the mow pump displacement may be mapped to the preset economy speed of 2000 RPM, to achieve the preset rotary blade speed of 13,000 feet per second, or the preset reel mower blade speed of 2000 rpm. In the automatically adjusting economy mode, the mow pump displacement may approach the maximum displacement. In block 220, the electronic control unit may command the traction pump displacement based on the commanded engine speed and traction pedal position of between 0 and 100%. For each pedal position, the traction pump displacement may be set higher in the automatically adjusting economy mode to achieve the same ground speed as the maximum power mode.

In one embodiment, in the automatically adjusting economy mode, the electronic control unit may compare engine load to one or more limits in block 222. If engine load is under a preset low limit such as 60% of maximum load, the electronic control unit may compare commanded engine speed to the economy engine speed in block 224. If commanded engine speed is the same as the economy engine speed, the electronic control unit may command the engine to hold that speed in block 226. If commanded engine speed is above the economy engine speed, the electronic control unit may command an incremental decrease in engine speed in block 228. In block 230, the electronic control unit may command the mow pump displacement based on the commanded engine speed between the economy engine speed and maximum power engine speed, to achieve the constant, preset mower blade speed. For example, the mow pump displacement may be mapped to the commanded engine speed between 2000 and 2600 RPM, to achieve the preset rotary blade speed of 13,000 feet per second, or the preset reel mower blade speed of 2000 rpm. In block 232, the electronic control unit may command the traction pump displacement based on the commanded engine speed and traction pedal position of between 0 and 100%. For each pedal position, the traction pump displacement may be set higher in the automatically adjusting economy mode to achieve the same ground speed as the maximum power mode.

In one embodiment, in the automatically adjusting economy mode, if engine load is above a preset intermediate limit such as 80% of maximum load, the electronic control unit may compare commanded engine speed to the maximum power engine speed in block 234. If commanded engine speed is the same as the maximum power engine speed, the electronic control unit may compare engine load to a high limit in block 236. If engine load is under a preset high limit such as 95% of maximum load, the electronic control unit may command the engine to hold the maximum power speed in block 238. If engine load is over the high limit, the electronic control unit may command the traction pump to reduce traction pump displacement in block 240. For each pedal position, the traction pump displacement may be set lower to achieve a lower ground speed as the maximum power mode.

In one embodiment, in the automatically adjusting economy mode, if engine load is above the intermediate limit in block 222, and commanded engine speed is under the maximum power engine speed in block 234, the electronic control unit may command an incremental increase in engine speed in block 242. In block 244, the electronic control unit may command the mow pump displacement based on the commanded engine speed between the economy engine speed and maximum power engine speed, to achieve the constant, preset mower blade speed. For example, the mow pump displacement may be mapped to the commanded engine speed between 2000 and 2600 RPM, to achieve the preset rotary blade speed of 13,000 feet per second, or the preset reel mower blade speed of 2000 rpm. In block 246, the electronic control unit may command the traction pump displacement based on the commanded engine speed and traction pedal position of between 0 and 100%. For each pedal position, the traction pump displacement may be set higher in the automatically adjusting economy mode to achieve the same ground speed as the maximum power mode.

In alternative embodiments, the mower blade speed control system may include an electronic control unit with a control algorithm that commands the mow pump displacement and/or traction pump displacement based on the actual engine speeds, instead of commanded engine speeds. Additionally, in alternative embodiments, the mower blade speed control system may include one or more additional sensors that are signal connected to the electronic control unit. For example, the system may include one or more pressure and flow sensors in the mow and/or traction hydraulic systems. In still other alternative embodiments, the mower blade speed control system may include variable displacement hydraulic motors that turn the mower blades at preset speeds commanded by the electronic control unit. Alternatively, the mower blade speed control system may include a continuously variable belt drive system having one or more variable diameter sheaves commanded by the electronic control unit, for rotating the mower blades and/or traction drive.

In other alternative embodiments, the mower blade speed control system may include an adjustable control connected to the electronic control unit that may be used to change the preset mower blade speed in the maximum power and/or economy modes. For example, an operator may use the adjustable control to set different mower blade speeds for different grass or hay species. Additionally, the mower blade speed control system may include adjustable controls that an operator may use to change and set the economy engine speed, maximum power engine speed, and/or low, intermediate and/or high limits for engine load.

In other alternative embodiments, the mower blade speed control system may be used on agricultural mowing machines for mowing hay or other vegetation, such as a windrower. The system would operate essentially the same as the mowing machine shown in FIGS. 1 and 2, except traction pump displacement would vary with the position of any other operated actuated traction drive speed control device such as a hydro handle or throttle lever that provides position feedback, instead of pedal position.

Having described a preferred embodiment, it will become apparent that various modifications can be made without departing from the scope of the invention as defined in the accompanying claims.

The invention claimed is:

1. A mower blade speed control system, comprising:
an electronic control unit providing engine speed commands to an internal combustion engine having a maximum power speed and a reduced engine speed;
a first continuously variable transmission with variable displacement providing rotational power from the engine to a plurality of mower blades;
a second continuously variable transmission with variable displacement providing rotational power from the engine to a traction drive;
a mode selection switch connected to the electronic control unit for selecting the maximum power speed, the reduced engine speed, or the reduced engine speed unless an engine load is outside preset limits, the electronic control unit changing the displacement of the first continuously variable transmission in response to the engine load to achieve a constant rotational speed of a plurality of mower blades at different engine speeds, and changing the displacement of the second continuously variable transmission in response to the engine load to achieve a higher displacement for each position of a traction pedal at the reduced engine speed than at the maximum power speed.

2. The mower blade speed control system of claim 1 wherein
the continuously variable transmission is a hydrostatic transmission.

3. The mower blade speed control system of claim 1 further comprising a continuously variable traction drive transmission having a displacement that varies with the position of a hand operated traction drive speed control device.

4. The mower blade speed control system of claim 1 wherein the electronic control unit decreases engine speed if engine load is below a low limit, and increases engine speed if engine load is above an intermediate limit.

5. A mower blade speed control system, comprising:
an internal combustion engine driving a plurality of mower blades with a hydrostatic mow transmission, driving a plurality of traction drive wheels with a hydrostatic traction drive transmission and pedals, and having a mode selection switch;

an electronic control unit monitoring load of the engine; and a mode selection switch connected to the electronic control unit and having a plurality of engine modes including:

a maximum power mode commanding the internal combustion engine to run at a maximum power speed, mapping a displacement of the mow transmission to the maximum power speed to achieve an optimal mower blade speed, and setting a displacement of the traction drive transmission based on the position of an operator actuated traction drive speed control device;

a maximum economy mode commanding the internal combustion engine to run at an economy speed lower than the maximum power speed, mapping the displacement of the mow transmission to the economy speed to achieve the same optimal mower blade speed, and setting the displacement of the traction drive transmission based on the position of the operator actuated traction drive speed control device; and an automatically adjusting economy mode commanding the internal combustion engine to run at the same economy speed lower than the maximum power speed, increasing or decreasing the engine speed based on the load of the engine, mapping the displacement of the mow transmission to achieve the same optimal mower blade speed, and mapping traction pump displacement to the position of the operator actuated traction drive speed control device and the commanded engine speed.

6. The mower blade speed control system of claim 5, wherein in the automatically adjusting economy mode, the electronic control unit commands engine speed to decrease if engine load is below a low limit and engine speed is above the economy engine speed.

7. The mower blade speed control system of claim 5, wherein in the automatically adjusting economy mode, the electronic control unit commands engine speed to increase if engine load is above an intermediate limit and engine speed is below the maximum power speed.

8. The mower blade speed control system of claim 5, wherein in the automatically adjusting economy mode, the electronic control unit commands the engine speed to hold at the last engine speed command if engine load is between a low limit and an intermediate limit.

9. The mower blade speed control system of claim 5 wherein in the automatically adjusting economy mode, the electronic control unit reduces the traction pump displacement based on pedal position if engine load is above a high limit.

10. A mower blade speed control system, comprising:

an electronic control unit providing engine speed commands to an internal combustion engine, providing displacement commands to a continuously variable mow transmission between the engine and a plurality of mower blades, and displacement commands to a continuously variable traction drive transmission between the engine and a plurality of traction drive wheels;

the electronic control unit monitoring engine load, increasing or decreasing engine speed if engine load is above or below at least one specified limit, and mapping mow pump displacement based on the commanded engine speed to achieve an optimal mower blade speed; and a mode switch connected to the electronic control unit to run the engine at a preset maximum power speed, a slower preset economy speed, or the preset economy speed unless the engine load is above or below at least one specified limit.

11. The mower blade speed control system of claim 10, wherein the electronic control unit maps traction pump displacement to a position of an operator actuated traction drive speed control device and the commanded engine speed.

12. The mower blade speed control system of claim 10, wherein the continuously variable mow transmission is a hydrostatic transmission.

13. The mower blade speed control system of claim 10, wherein the continuously variable traction drive transmission is a hydrostatic transmission.

* * * * *